April 17, 1956 M. E. PARTIN 2,742,531

PILOT SIGNAL CONTROLLED, COLOR REGISTRATION SYSTEM

Filed Aug. 17, 1951 3 Sheets-Sheet 1

INVENTOR.
MELVIN E. PARTIN
BY
Green V. Hazeltine
ATTORNEY

April 17, 1956 M. E. PARTIN 2,742,531
PILOT SIGNAL CONTROLLED, COLOR REGISTRATION SYSTEM
Filed Aug. 17, 1951 3 Sheets-Sheet 2
FIG. 2.
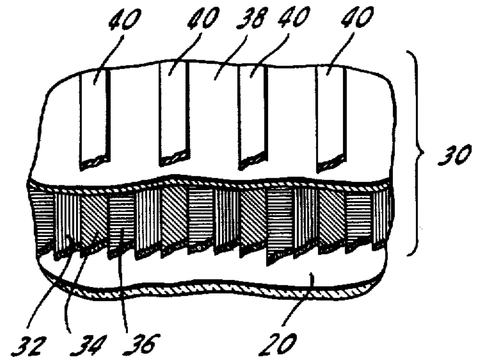
FIG. 3.
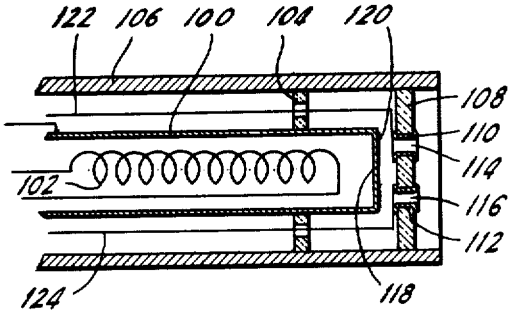
FIG. 4.
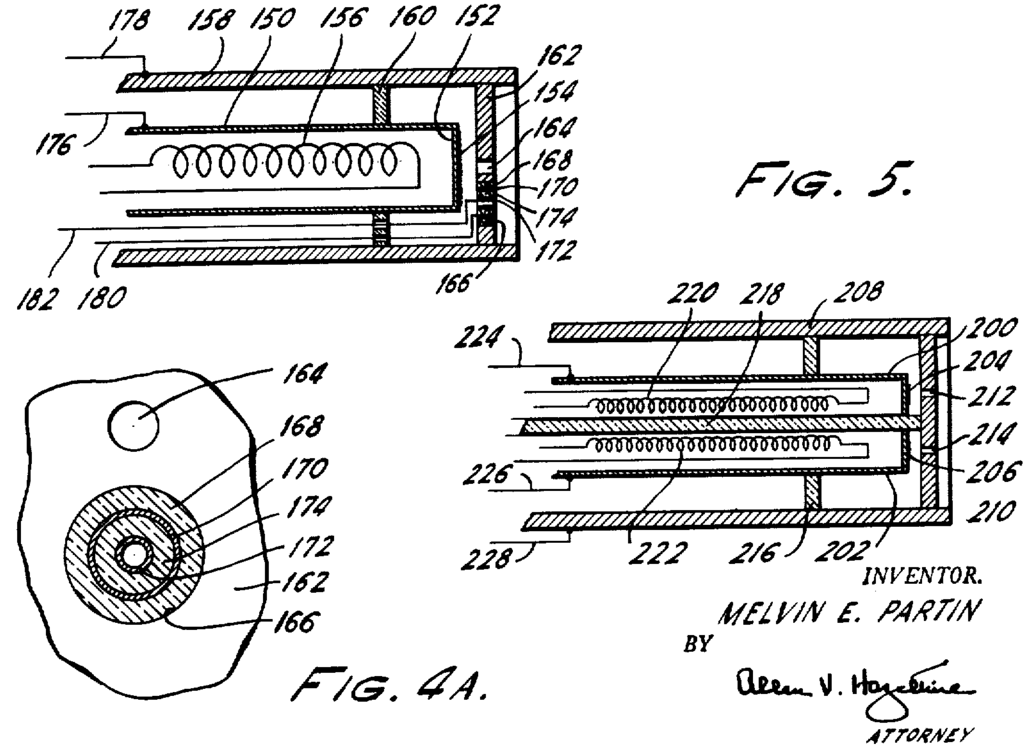
FIG. 4, FIG. 4A, FIG. 5
INVENTOR.
MELVIN E. PARTIN
BY
Allen V. Hazeltine
ATTORNEY April 17, 1956 M. E. PARTIN 2,742,531

PILOT SIGNAL CONTROLLED, COLOR REGISTRATION SYSTEM

Filed Aug. 17, 1951 3 Sheets-Sheet 3

INVENTOR.
MELVIN E. PARTIN
BY
ATTORNEY

United States Patent Office 2,742,531

Patented Apr. 17, 1956

2,742,531

PILOT SIGNAL CONTROLLED, COLOR REGISTRATION SYSTEM

Melvin E. Partin, Philadelphia, Pa., assignor to Philco Corporation, Philadelphia, Pa., a corporation of Pennsylvania Application August 17, 1951, Serial No. 242,264

19 Claims. (Cl. 178—5.4)

The present invention relates to electrical systems, and more particularly to cathode-ray tube systems comprising a cathode-ray tube adapted to produce a plurality of intelligence stimuli in response to a plurality of individual signals applied to cathode-ray beam controlling means for the tube.

While the invention is also applicable to other forms of cathode-ray tube systems, as later to be more fully discussed, the invention is of particular utility in systems in which the cathode-ray tube embodies a beam intercepting structure and an indexing system which is adapted to produce a signal whose time of occurrence is indicative of the position of the cathode-ray beam relative to the beam intercepting structure. Cathode-ray tubes of this latter type are commonly used for reproducing color television images and, in one form, the beam intercepting structure serving as the image reproducing screen may comprise vertically arranged stripes of fluorescent materials.

These stripes are preferably arranged in laterally-displaced color triplets, each triplet comprising three vertical phosphor stripes which respond to electron impingement to produce light of three different primary colors. The order of arrangement of the stripes may be such that the normal horizontally-scanning cathode-ray beam produces red, green and blue light successively. From a color television receiver there may then be supplied three separate video signals, each indicative of a different primary color component of a televised scene, which signals are utilized to sequentially control the intensity of the cathode-ray beam. For proper color rendition, it is then required that, as the phosphor stripes producing each of the primary colors of light are impinged by the cathode-ray beam, the intensity of the beam is simultaneously controlled in response to the contemporaneous value of the video signal representing the corresponding color component of the televised image. However, since the rate at which the beam scans across the phosphor stripes of the screen may vary, due, for example, to non-linearity of the beam deflecting signal, or due to a non-uniform distribution of the color triplets on the screen surface, the times at which the several video color signals should be applied to the tube will generally not occur exactly periodically. To obtain proper synchronism between the application of a given color signal and the impingement of the beam on a corresponding color stripe of the screen, it is desirable to derive signals indicative of the instantaneous position of the cathode-ray beam upon the image-forming screen, and to utilize these indexing signals to control the application of the several color signals to the cathode-ray tube. The said indexing signals may be derived from a plurality of stripe members arranged on the beam intercepting screen structure each adjacent a triplet so that, when the beam scans the screen, the indexing stripes are excited in spaced time sequence relative to the scanning of the color triplets and an indexing signal is generated in a suitable output electrode system of the cathode-ray tube.

The indexing stripes may comprise a material having secondary-emissive properties which differ from the secondary-emissive properties of the remaining portions of the beam intercepting structure. For example, the indexing stripes may consist of a high atomic number material such as gold, platinum or tungsten or may consist of oxides, such as magnesium oxide, and the remainder of the beam intercepting structure may be provided with a coating of a material having a detectably different secondary-emissive ratio, such as aluminum, which coating may also serve as a light reflecting mirror for the phosphor stripes in accordance with well known practice. With such an arrangement, the indexing signals may be derived from a collector electrode arranged in the vicinity of the screen structure. Alternatively, the indexing stripes may consist of a fluorescent material such as zinc oxide having a spectral output in the non-visible light region and the indexing signals may be derived from a suitable photoelectric cell arranged, for example, in a side wall portion of the cathode-ray tube out of the path of the cathode-ray beam and facing the beam intercepting surface of the screen structure.

In practice there exists the danger that the normally detectable voltage indicating the impingement of the beam onto the indexing stripes may be masked or at least contaminated by spurious voltages. More particularly, it is found that, at the high accelerating voltages of the order of 10 to 20 kilovolts commonly used in cathode-ray tubes for the systems under consideration, only a relatively small difference in the secondary-emissive ratio of the materials of the indexing stripes and of the remainder of the screen structure can be realized, and that, in the heretofore proposed systems, the presence of video signals and noise voltages in the collector electrode system may significantly diminish the effective value of the indexing signal. Similarly, in those instances in which the indexing signal is produced by means of a photo-electric detector and indexing stripes comprising a fluorescent material which produces light in the non-visible region of the spectrum, the detector may be also actuated by soft X-rays which are produced by the high voltage beam, or by extraneous light from sources external to the cathode-ray tube or from the phosphor stripes of the color triplets, the latter light in some instances penetrating the aluminum mirror coating superimposed on the color stripes.

In the operation of a monoscope, a television camera, or similar cathode-ray tube device for producing a video signal indicative of spectral information supplied to the tube, it is desirable that the generated signal have a high signal-to-noise ratio, be free of spurious components and be representative of a high degree of visual definition. All of these objectives have not been achieved to the utmost extent in prior devices because of the conflicting requirements imposed on the signal generating tube. Thus, in order to achieve good definition, it has been necessary to limit the electron beam of the tube to relatively small current values and to operate the tube into a load impedance of relatively low value. These expedients limit the signal output level of the tube and correspondingly decrease the signal-to-noise ratio of the generated signal. In attempts to increase the output signal level by the use of larger beam currents, it is found that problems of focusing the beam into a small scanning spot are introduced, and the effective resolution of the tube is impaired. The use of a load impedance of relatively high value in an attempt to increase the output signal level, has been found to limit the high frequency response of the tube and similarly impair its effective resolution.

It is an object of the invention to provide an improved cathode-ray tube system comprising a cathode-ray tube adapted to produce a plurality of intelligence stimuli in response to a plurality of individual signals applied to beam controlling means for the tube.

A further object of the invention is to provide an improved cathode-ray tube system of the type in which the position of the electron beam relative to a beam intercepting member is indicated by a signal derived from an indexing member arranged in cooperative relationship to the beam intercepting member.

Another object of the invention is to provide a cathode-ray tube system of the type in which the position of the electron beam is indicated by a signal derived from an indexing member and in which a clearly defined indexing signal is generated.

Another object of the invention is to provide a cathode-ray tube system for generating an image signal of effectively high definition and large signal-to-noise ratio.

These and further objects of the invention will appear as the specification progresses.

In accordance with the invention, the foregoing objects are achieved by a cathode-ray tube system comprising a cathode-ray tube having a plurality of beams individually controllable by individually applied control signals. By means of the said applied signals, the beams are made to exhibit given specific characteristics markedly distinguishing one beam from the other. The individual beams are so arranged as to actuate a common output system of the cathode-ray tube and, by appropriate selective controls at the output system of the tube, the stimuli produced by each of the beams are derived individually.

More specifically, and in accordance with one embodiment of the invention employing a cathode-ray tube having disposed therein a beam intercepting structure having portions thereof adapted to produce a first given response upon impingement by the beam and having other portions thereof comprising beam position indicating elements arranged in predetermined geometric relationship to the beam intercepting structure, there is provided a cathode-ray tube having two individually controllable electron beams which simultaneously impinge on the beam intercepting structure. One of the beams is varied in intensity by means of a first signal having a given frequency spectrum and the beam is adapted to energize the beam intercepting structure to produce a first given desired response. The other beam is varied in intensity at a separate rate by means of a second signal having a frequency spectrum readily distinguishable from the first frequency spectrum and is adapted to energize the beam position indicating elements of the beam intercepting structure. Since both beams impinge on the beam intercepting structure, and hence on the beam position indicating elements thereof, an output system coupled to the indicating elements would normally contain signal energy indicative of the relationship between the first signal and the beam intercepting elements and the relationship between the second signal and the beam intercepting elements. As above pointed out, the first and second beams are made to have markedly different characteristics, i. e., are varied in intensity at readily distinguishable frequencies. Therefore, by means of suitable frequency filtering means the two output signals generated by the respective beams may be readily separated.

In a system of the foregoing type as applied to the reproduction of a color television image, the beam intercepting structure of the cathode-ray tube may comprise as a first portion, successively positioned laterally-displaced color triplets, each triplet comprising three vertical phosphor stripes which respond to electron impingement to produce light of the different primary colors. The structure may further comprise, as a second portion constituting the beam position indicating elements, spaced stripes of a material which, upon impingement of the beam, provide a response which is different from that provided by the remainder of the structure. The cathode-ray tube further comprises a beam generating system producing two electron beams which simultaneously scan the beam intercepting structure, preferably under control of the same deflecting system. The source of the two electron beams may be in the form of individual gun assemblies arranged adjacent to each other, or may be in the form of a single gun assembly having individual cathode segments or individual control grids so that the beams may be individually varied in intensity.

To the cathode-ray tube so constituted there is then applied to the intensity control system of one of the beams a first control signal of given frequency range and indicative of the information representing the color image to be reproduced as the beam scans the color triplets. A second control signal having a frequency outside the range of the frequencies of the first signal is applied to the intensity control system of the second beam and correspondingly varies the intensity thereof at the second control signal rate. Preferably, the initial intensity of the second beam has such a value and/or the intensity variations thereof occur at such a rate that the second beam produces no significantly observable effects on the color triplets.

As they scan the indexing stripes of the beam intercepting structure, the two electron beams will produce in the output system of the tube two heterodyne signals, each having a frequency spectrum as determined by the frequency of the intensity variations of the respective beams and by the rate of scanning of the indexing stripes. By an appropriate selection of the frequency of the control signal which is applied to control the intensity of the second beam relative to the frequency spectrum of the video signal which is applied to control the intensity of the first beam, the spectra of the heterodyne signals produced may be made sufficiently different so that the respective heterodyne signals may be readily separated.

The heterodyne signal produced by the second beam consists essentially of a carrier wave at the frequency of the beam intensity control signal and of sidebands representing the sum and difference of the control signal frequency and the rate of scanning of the index stripes. Any change in the rate of scanning of the index stripes will be indicated by a change in the frequencies of the sidebands. Since the two beams move in synchronism under the control of the same deflecting forces and impinge on the same or predeterminedly spaced adjacently positioned portions of the beam intercepting structure, the heterodyne signal produced by the second beam is indicative of the position of the first beam and hence the said heterodyne signal or a sideband thereof may be utilized as an indexing signal. This indexing signal will be free of any undesired spurious components derivable from the video signal applied to the first beam.

In accordance with another embodiment of the invention, there is provided a cathode-ray tube system for generating a video signal proportional to the spectral variations of an image developing a corresponding electrical charge distribution on a suitable target electrode. The cathode-ray tube thereof comprises a beam generating system providing a plurality of electron beams and to which indvidual control signals are applied for individually varying the intensities of the respective beams at selectively discernible rates to thereby provide at the common output of the tube a plurality of readily separable signals. More specifically, and in the use of the invention as applied to a monoscope type of cathode-ray tube, the cathode-ray tube embodies means to generate two beams individually controllable in intensity. To the intensity control element of one of the beams there is applied a first control signal for varying the intensity of the beam at a predetermined rate. As this beam scans the target electrode, it will produce, at a suitable collector electrode of the tube, and output signal which represents the heterodyne products of the intensity variations of the beam and the space charge information contained at the target electrode. The second beam may be maintained at a constant intensity value or may be similarly varied in intensity at a frequency different from the frequency of the first control signal, so that the second beam will also produce an output signal with the information contained in the space charge at the target electrode. By a suitable selection of the frequency at which the intensity of the first beam is varied, the frequency spectra of the two output signals may be made mutually exclusive and readily separated into individual channels by simple frequency selective means. Thereafter, the signals may be operated upon in any desired manner; for example, the heterodyne signal may be applied to a suitable detector to recover the information modulating the same and the detected information combined with the signal produced by the other of the said beams. In one realization of this embodiment of this invention, the first beam may be a sharply focused beam of rather low current density, thereby being well adapted to produce an output signal of large bandwidth and representing a high degree of resolution. Since the heterodyne output signal produced by this beam may be centered at such a high frequency value that the sidebands thereof represent only a small percentage departure from the carrier frequency, a simple load circuit of relatively high impedance value at the carrier frequency may be used without loss of definition, so that a large heterodyne signal is generated by the tube. The second beam may be of rather large current density and correspondingly more poorly focused so that only relatively low frequency information is derived from the tube by the second beam. Since only low frequency information is involved in this instance, the load impedance of the tube may similarly have a large value, thereby producing an output signal of large amplitude.

The invention will be described in greater detail with reference to the appended drawings forming part of the specification and in which:

Figure 2 is a cross-sectional view, partly cut away, showing a portion of one form of beam intercepting structure for a cathode-ray tube which may be used in the embodiment of the invention shown in Figure 1;

Figures 3, 4 and 5 are cross-sectional views showing various forms of dual beam generating systems for cathode-ray tubes applicable to the systems of the invention;

Figure 6:
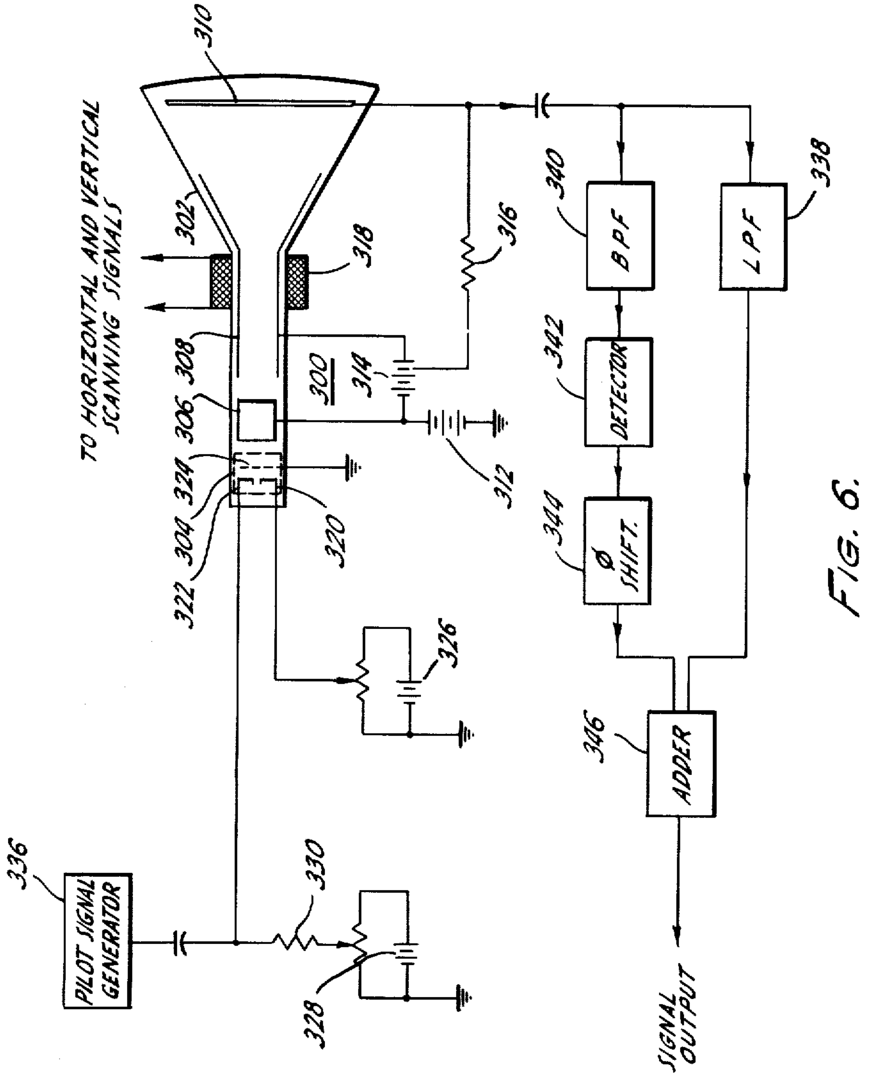

Figure 4*a* is an end view of a portion of the beam generating system shown in Figure 4; and Figure 6 is a block diagram, partly schematic, illustrating another embodiment of the invention.

Figure 1:
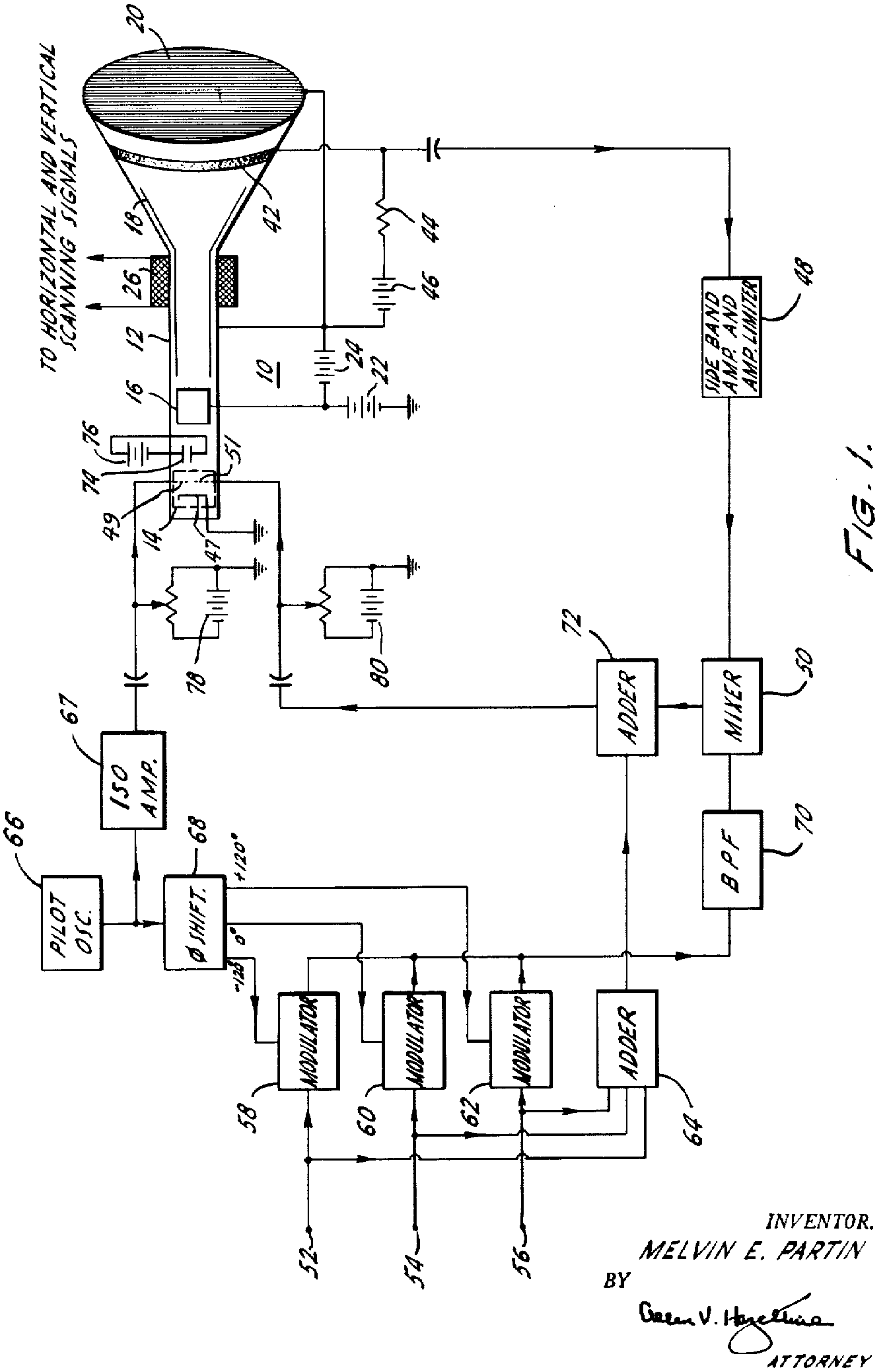
Figure 1 is a block diagram, partly schematic, illustrating one embodiment of the invention.

Referring to Figure 1, the cathode-ray tube system shown therein comprises a cathode-ray tube 10 containing, within an evacuated envelope 12, a dual beam generating and controlling system 14 later to be more fully described, a focusing electrode 16, and a beam accelerating electrode 18 which may consist of a conductive coating on the inner wall of the envelope and which terminates at a point spaced from the end face 20 of the tube in conformance with well-established practice. The electrodes are energized from suitable sources of potential shown as a battery 22 having its negative pole connected to ground and its positive pole connected to the electrode 16 and a battery 24 having its negative pole connected to the positive pole of the battery 22 and its positive pole connected to the accelerating electrode 18. In practice the battery 22 has a potential of the order 1 to 3 kilovolts whereas the battery 24 has a potential of the order of 10 to 20 kilovolts.

A deflection yoke 26 coupled to horizontal and vertical deflection circuits of conventional design is provided for deflecting the dual electron beams across the face plate 20 of the cathode-ray tube to form a raster thereon.

The end face plate 20 of the tube is provided with a beam intercepting structure 30, one suitable form of which is shown in detail in Figure 2. In the arrangement shown in Figure 2, the structure 30 is formed directly on the face plate 20; however, the structure 30 may alternatively be formed on a suitable light transparent base which is independent of the face plate 20 and may be spaced therefrom. In the arrangement shown, the end face 20, which in practice consists of glass having preferably substantially uniform transmission characteristics for the various colors in the visible spectrum, is provided with a plurality of groups of elongated, parallely arranged stripes 32, 34 and 36, of phosphor material which, upon impingement of a cathode-ray beam, fluoresce to produce light of three different primary colors. For example, the stripe 32 may consist of a phosphor which produces red light, the stripe 34 may consist of a phosphor which produces green light, and the stripe 36 may consist of a phosphor which produces blue light. Each of the groups of stripes may be termed a color triplet and, as will be noted, the sequence of the stripes is repeated in consecutive order over the area of the structure 20. Suitable materials constituting the phosphor stripes 32, 34 and 36 are well known to those skilled in the art as well as the method of applying the same to the face plate 20, and further details concerning the same are believed to be unnecessary.

In the arrangement specifically shown, the indexing signal is produced by utilizing indexing stripes of a given secondary-emissive ratio differing from the secondary-emissive ratio of the remainder of the beam intercepting structure. For this purpose the structure 30 further comprises a thin electron permeable conducting layer 38 of relatively low secondary-emissivity. The layer 38 is arranged on the phosphor stripes 32, 34 and 36 and preferably, further constitutes a mirror reflecting light generated at the phosphor stripes. In practice, the layer 38 is a light reflecting aluminum coating which is formed in well know manner. Other metals capable of forming a coating in the manner similar to aluminum, and having a secondary-emissive ratio detectably distinct from that of the material of the indexing stripes, may also be used. Such other metals may be, for example, magnesium or beryllium.

Arranged on the coating 38 over consecutive green stripes 34, are indexing stripes 40 consisting of a material having a secondary-emissive ratio detectably different from that of the material of coating 38. The stripes 40 may consist of gold or of other high atomic number metals such as platinum or tungsten, or may consist of an oxide such as magnesium oxide.

The beam intercepting structure so constituted is connected to the positive pole of the battery 24 by means of a suitable lead attached to the aluminum coating 38.

Interposed between the end of the accelerating anode 18 and the beam intercepting structure formed on the face plate 20 is an output collector electrode 42 consisting of a ring shaped coating, for example of graphite or of silver, on the wall of the envelope. Electrode 42 is energized through a load resistor 44 from a suitable source 46, shown as a battery. The source 46 may have a potential of the order of 3 kilovolts.

The cathode-ray tube 10 is provided with means to generate two cathode-ray beams, the intensities of which are individually controllable. For this purpose, the system 14 may comprise two individual gun assemblies, each of conventional construction, arranged in adjacent relationship and each comprising a suitable cathode source and a control electrode for varying the intensity of the beam. Alternatively, the system 14 may comprise a single gun assembly adapted to generate two beams individually controllable in intensity. One form of construction of a single gun assembly adapted to generate two individually controlled beams is shown in Figure. 3. The assembly there shown comprises a cylindrical cup-shaped member 100 serving as a cathode body and consisting of a suitable metal, for example of nickel. Within the member 100 is a heating source of conventional form which has been shown as a helical filament 102, for example of tungsten wire. The filament 102 may be electrically insulated from and maintained in good heat conductive relationship with the element 100 by a suitable refractory insulating covering (not shown) in accordance with well known practice. Surrounding the cathode element 100, and spaced therefrom by a heat resistant, electrically insulating annular spacer 104, is a cylindrical metal member 106 serving as a heat and electric-field shield for the cathode member 100. The shield 106 is closed at its end by an electrically insulating, preferably refractory, disc 108 provided with two apertures 110 and 112. Apertures 110 and 112 are lined with metal bushings 114 and 116 respectively, each serving as a control electrode for varying the intensity of the respective electron beam passing therethrough.

As a source of electrons for the beams passing through the apertures 110 and 112, the end face 118 of the cathode member 100 is provided with an electron emissive coating 120 of conventional composition, for example a coating consisting of a mixture of barium and strontium oxides activated in well known manner to produce an electron emissive surface. For individually controlling the intensities of the respective beams, individual wire connections 122 and 124 are provided for the control electrodes 114 and 116 respectively, these connections being led to the rear of the cathode assembly through appropriate apertures in the spacer 104.

In the arrangement shown in Figure 3, the beams emanating from the control electrodes 114 and 116 are symmetrically arranged about the common axis of the gun assembly and have similar characteristics. In some instances, it may be desirable to provide a gun assembly producing a main beam which is coaxial to the gun assembly and has a relatively large current capacity, and an auxiliary beam which is arranged off the axis of the gun assembly and has a relatively smaller current capacity. A gun assembly conforming to these requirements is shown in Figures 4 and 4*a*. The assembly illustrated, comprises a cathode cup member 150, the end face 152 of which is provided with an electron emissive coating 154. The cathode member 150 encloses a heating filament 156 and is surrounded by a metal shield 158, the cathode member and the shield being secured in spaced relationship by an insulating annular member 160. Closing the end of the shield 158 and electrically connected thereto, is a metal disc 162 provided with a centrally positioned aperture 164 and a second aperture 166 arranged off-center. The aperture 166 is provided with an insulating liner 168 (see Figure 4*a*) which in turn supports a metal bushing 170, a second metal bushing 172 coaxially disposed within the bushing 170 and an insulating liner 174 interposed between the bushings 172 and 174. The disc 162 serves as an intensity control electrode for the electron beam passing through the aperture 164 thereof, whereas the bushing 172 serves as an intensity control electrode for the off-centered beam passing therethrough. By means of the bushing 170 an electrostatic shield between the bushing 172 and the surrounding disc 162 is provided. Suitable electrical connections for the cathode 150, the control electrode 162, the shield 170 and the control electrode 172 are provided by terminal leads 176, 178, 180 and 182 respectively, the latter two leads passing through suitable apertures in the spacer 160.

Whereas in the arrangements shown in Figures 3 and 4 the individually controllable cathode-ray beams derive from a unitary cathode structure and electrically separated control electrodes are arranged in the path of each beam for varying the intensity of the beams, the individual beams may be derived from electrically separated cathode elements which cooperate with a common control electrode system to provide the desired individual control of the intensity of the beams. Such a construction is shown in Figure 5, wherein the dual beam gun assembly comprises, a cathode system constituted by two semi-cylindrical, cup-shaped metal portions 200 and 202 arranged in confronting relationship and the end face portions of which are provided with individual electron emissive coatings 204 and 206 respectively. The portions 200 and 202 are enclosed by a cylindrical metal shield 208, the end of which carries a metal disc 210 provided with two apertures 212 and 214 through which pass the beams from the cathode coatings 204 and 206 respectively. Cathode portions 200 and 202 are supported within the shield 208, and insulated therefrom, by an electrically insulating spacer 216. An insulating plate member 218 is arranged between the cathode elements and abuts the inner surface of the disc 210, thereby serving to prevent electrical leakage between the cathode elements. Suitable heating means shown as filamentary helices 220 and 222 are provided for maintaining the cathode emission surfaces at their operating temperature. Outside electrical connections to the gun assembly are provided by terminal leads 224, 226 and 228. By applying individual control voltages to the leads 224 and 226 the potentials of the cathode elements may be individually varied relative to the common control electrode thereby producing the desired individual control of the intensities of the beams derived from the respective cathode elements.

Referring again to Figure 1, in which a gun assembly of the type shown in Figures 3 and 4 has been schematically illustrated, it will be noted, that the two beams generated by a common cathode 47 are individually controllable by separate intensity control electrodes 49 and 51 which are maintained at desired operating bias voltage values by bias supply systems 78 and 80 respectively. The control electrode 49 is energized by a pilot carrier wave derived from a pilot oscillator 66 through an isolation amplifier 67, whereas the control electrode 51 is energized by a video color wave as is later more fully described, whereby the beam under the control of the electrode 49 undergoes intensity variations at the pilot carrier rate and the beam under the control of electrode 51 undergoes intensity variations as determined by the video color signal. The two beams, so varied in intensity, are simultaneously scanned across the surface of the beam intercepting structure 30 (see Figure 2) formed on the face plate 20 under the action of the deflecting coil 26. In its horizontal travel across the beam intercepting structure, the beam under the control of electrode 49 impinges successively on the coating 38 and the indexing stripes 40 and will generate across the load resistor 44 an indexing signal made up of a carrier component at the pilot carrier frequency and sideband components representing the sum and difference frequencies of the pilot frequency and the rate at which the index stripes are scanned by the cathode-ray beam.

In a typical case, the pilot carrier variations of the intensity of the beam under the control of electrode 49 may occur at a frequency of approximately 38.5 mc./sec. When the rate of scanning the index stripes 40 is approximately 7 million per second, as determined by the horizontal scanning rate and the number of index stripes impinged per scanning period, there is produced across load resistor 44 a modulated carrier signal at a frequency of 38.5 mc./sec. having sidebands at approximately 31.5 and 45.5 mc./sec. Changes in the rate of scanning of the index stripes 40, due to non-linearities of the beam deflection and/or non-uniformities of the spacing of the index stripes, will produce corresponding changes in the frequencies of the sidebands. Therefore, the signal produced by the beam under the control of electrode 49, or a sideband of this signal, may be used as an indexing signal indicative of the position of the beam on the surface of the beam intercepting structure 30. In the arrangement specifically shown in Figure 1, the lower sideband, i. e., the sideband at approximately 31.5 mc./sec., is utilized as the indexing signal, and accordingly this signal is separated from the signals generated across load resistor 44 by a sideband amplifier and amplitude limiter 48 and applied to a utilization circuit therefor consisting of a mixer 50. Amplifier 48 is of conventional design, and is characterized by a passband response which transmits and amplifies only signals having a frequency in the range of the above noted lower sideband. The amplifier may embody conventional amplitude limiting means by which any amplitude modulation appearing on the signal may be removed and may be adapted to provide the desired amplification without phase distortion of the applied signal.

For the reproduction of a color image on the face plate of the cathode-ray tube, there are provided color signal input terminals 52, 54 and 56 which are supplied from a television receiver with separate signals indicative of the red, green and blue components of the televised scene, respectively. The system then operates to convert these three color signals into a wave having the color information arranged in time reference sequence so that the red information occurs when the cathode-ray beam under the control of the electrode 51 impinges the red stripe 32 of the beam intercepting structure 30, the green information occurs upon impingement of the green stripe 34 and the blue information occurs when the blue stripe 36 is impinged.

The conversion of the color signals into a wave having the color information arranged in time reference sequence may be achieved by means of a modulation system suitably energized by the respective color signals and by appropriately phase-related modulation signals. In the arrangement specifically shown, the desired conversion is effected by means of sine wave modulators 58, 60 and 62 in conjunction with an adder 64. Modulators 58, 60 and 62 may be of conventional form and may each consist, for example, of a dual grid thermionic tube to one grid of which is applied the color signal from the respective terminals 52, 54 and 56, and to the other grid of which is applied a modulation signal. The modulation signals are derived from the pilot oscillator 66 through a phase shifter 68, the latter being adapted to produce, by means of suitable phase shifting networks, three modulation voltages appropriately phase displaced. In the arrangement specifically described, wherein the phosphor stripes 32, 34 and 36 (see Figure 2) are uniformly distributed throughout the width of each color triplet, the modulation voltages from the phase shifter, 68 bear a 120° phase relationship as shown.

The individual waves produced at the outputs of the modulators will be sine waves, each amplitude modulated by the color signal applied to the respective modulators, and each having a phase relationship determined by the particular modulation signal applied. The three modulators are coupled with their outputs in common, whereby the three waves are combined to produce a resultant wave having a frequency at the frequency of the oscillator 66 and having amplitude and phase variations proportional to the relative amplitudes of the color signals. A band-pass filter 70, having a central frequency as determined by the frequency of the modulating signals applied to the modulators, may be arranged in the common output of the modulators to suppress undesirable modulation components.

The resultant wave at the common output circuit of modulators 58, 60 and 62 is applied to the mixer 50 together with the indexing signal derived from the amplifier and limiter 48 to produce a heterodyne difference signal having amplitude and phase variations as determined by the relative amplitudes of the color signals at the terminals 52, 54 and 56, and having further phase, and/or frequency, variations as determined by the variations in the rate of scanning the index stripes of the beam intercepting structure of the cathode-ray tube. It will be noted that since the variations of the intensity of the cathode-ray beam under the control of the electrode 49 and the modulation of the color signals at terminals 52, 54 and 56 are at the same frequency, the heterodyne difference signal produced by mixer 50 will have a central frequency equal to the average rate of scanning the index stripes so that each successive color triplet of the structure 30 will be energized by successive cycles of the said difference signal.

Each of the color signals supplied to the input terminals of modulators 58, 60 and 62 will, in general, include a reference level component definitive of brightness. While each modulator may be constructed so as to transmit this reference level component to its output, in practice this is generally not done. Preferably, the three color signals are combined, in proper proportions, in the adder 64 to yield a single signal representative of the overall brightness of the image to be reproduced, and this signal is in turn applied to an adder 72 where it is combined with the signal produced in the output of mixer 50.

The signal at the output of the adder 72 thus comprises a first component establishing the brightness information of the image to be reproduced and a modulated component establishing the chromaticity of the image. This signal is applied to the control electrode 51 of the cathode-ray tube to thereby vary the intensity of the corresponding cathode-ray beam in time sequence with the scanning of the beam over consecutive phosphor stripes of the beam intercepting structure.

It will be noted that the closed circuit containing the index signal which controls the phase position of the color video wave, includes the cathode-ray beam controlled by the electrode 51, the amplifier 48, the mixer 50 and the adder 72. In some instances, the signal path through these components may involve a sufficient phase lag so as to cause the beam which is under the control of electrode 51, to impinge to a greater or lesser degree on a phosphor stripe adjacent to the particular phosphor stripe corresponding to the contemporaneous value of the applied video signal. Such a possibility may occur when using screen structures of unusually high definition, in which instance a relatively large number of color triplets are impinged by the beam during each scanning cycle. The cathode-ray tube system of the invention lends itself to the further advantage that this phase lag can be compensated. More particularly, by horizontally displacing the point of incidence of the beam under the control of electrode 49 relative to the point of incidence of the beam under the control of electrode 51 by an amount corresponding to the time lag in the closed circuit under consideration, this phase lag can be compensated to the desired degree. The displacement of the beams to achieve the desired phase compensation may be brought about by suitably spacing the origin of the respective beams and/or the initial directions of the beams, or may be brought about by means of an auxiliary deflecting electrode system adapted to provide one beam with an initial deflection of the required amount. Thus, as shown in Figure 1, the beam under the control of electrode 49, may be given an initial horizontal displacement by means of deflecting electrodes 74 coupled to a deflecting voltage source 76 and interposed between the dual beam assembly 14 and the focusing electrode 16.

In the embodiment shown in Figure 6, the principles of the invention are illustrated as applied to a video signal generating system, and specifically, a monoscope system. The arrangement shown, comprises a cathode-ray tube 300 containing, within an evacuated envelope 302, a gun assembly 304 for generating two electron beams and individually controlling the intensities thereof, a focusing electrode 306, an accelerating electrode 308 and a target electrode 310. The accelerating electrode 308 may be in the form of a conductive coating of graphite or silver on the inner surface of the envelope 302, whereas the target electrode 310 may consist of a metal plate on the surface of which facing the dual beam generating system 304, there is printed the pattern to be electrically reproduced. Suitably, the target electrode may consist of an aluminum plate having an oxide coating, and the pattern printed thereon in carbon ink or other material having a secondary-emissive ratio different from that of the target plate, in conformance with standard practice.

Electrodes 306, 308 and 310 are energized from a suitable voltage source shown as batteries 312 and 314 connected in series, electrode 310 being connected to a tapping of the battery 314 through a load impedance 316.

A deflection yoke 318 coupled to horizontal and vertical deflection circuits of conventional design, is provided for deflecting the beams from the assembly 304 across the target electrode 310 to form a raster thereon.

The gun assembly 304 is schematically represented as being of the type having dual cathode units and a common control grid, such as the assembly described above with reference to Figure 5. Thus, the assembly 304 comprises electrically separated first and second cathode elements 320 and 322 and a control grid 324 which is electrically common to the cathode elements. Cathodes 320 and 322 are maintained at appropriate operating potentials relative to control grid 324 by means of bias voltage sources 326 and 328, the latter being connected to the cathode 322 through an impedance 330. Control grid 324 may be connected to a point of low potential as shown.

In accordance with the invention, the individual beams produced by the assembly 304 are given such markedly different characteristics that the signals produced by the respective beams upon impinging the target 310, may be readily identified and separated from each other. Thus, in the particular arrangement specifically shown in Figure 6, the beam derived from the cathode 320 is varied in intensity at a given rate determined by a control signal applied thereto from a pilot signal generator 336, whereas the beam from the cathode 322 is maintained at a constant intensity value as established by the operating bias voltage applied to the cathode 320.

Under the action of the deflecting coil 318 the two beams are scanned across the target electrode 310 and simultaneously impinge on the same portion of the target electrode. In so doing, the beam from cathode 320 releases secondary electrons from the target 310, the number of which is a function of the intensity of the beam and the secondary-emissive ratio of the particular portion of the target on which the beam is impinging. The electrons released from the target 310 will produce a corresponding voltage across load impedance 316 and, in the continuous scanning of the target, a picture signal of the image printed on the target will be formed. This picture signal will have a frequency spectrum determined by the velocity at which the target is scanned and by the the amount of information contained thereon as resolved by the scanning beam. In a monoscope system for use in television systems operating in accordance with present standards, the frequency spectrum of the generated signal may have a range extending from approximately 85 c./sec. to approximately 5 mc./sec.

In similar manner, the beam from the cathode element 322 will release secondary electrons from the target 310 in proportion to the intensity of the beam and the secondary-emissive ratio of the particular point of the target on which the beam is impinging. The secondary-electrons so emitted will produce a picture signal across the load impedance 316 which signal has a frequency spectrum determined not only by the velocity of the scanning beam and the resolvable information of the target electrode but also by the frequency at which the intensity of the beam is varied by the pilot signal applied to cathode element 322 from the generator 336. This latter picture signal is in effect an amplitude modulated signal having a carrier frequency as determined by the frequency of the pilot generator 336 and sidebands as determined by the picture information of the target electrode.

By a suitable selection of the frequency of the generator 336, i. e., a frequency of 20 mc./sec. when generating a video signal with a 5 mc./sec. bandwidth as above specifically illustrated, the frequency spectrum of the signal generated by the beam from cathode 322 may be made mutually exclusive to the frequency spectrum of the signal generated by the beam from the cathode 320. Under this condition the two generated signals may be readily separated into two separated channels. More particularly, and as shown in Figure 6, the two signals developed across the load impedance 316 may be applied to a low pass filter 338 having a cut-off at the maximum frequency of the signal generated by the beam from cathode 320, and further applied to a band-pass filter 340 adapted to pass only the signal generated by the beam from the cathode element 322. The two signals so produced may be operated on in any desired fashion. For example, the signal at the output of filter 340 may be applied to a detector 342 of conventional design, i. e., a diode detector, to recover the target information contained thereon, so that there is formed at the output of the detector a picture signal substantially identical to the picture signal derived at the output of low pass filter 338. The two picture signals so obtained may be combined by means of an adder 346 to produce an output signal of increased amplitude. By means of a phase shifter 344 variations of the transit times of the signals in the two channels may be compensated so that the two signals may be combined in phase coincidence.

Suitable amplifiers (not shown) of conventional design may be included in the respective channels.

The system of Figure 6 may also be operated in the manner previously indicated so that one beam produces a signal having predominantly low frequency information and the other beam supplies high frequency information effectively increasing the resolution of the system. More particularly, the beam produced by cathode 320 may be a large current beam with a correspondingly large focal spot at the target 310 and the beam from cathode 322 may be a beam of relatively low current with a relatively small focal spot so that two signals as above qualified are generated across the output load impedance of the tube. Since the signal produced by the beam from cathode 320 thus contains only low frequency information, the load impedance may be given a large value so that, in view of the large beam current and the large load impedance, a large amplitude signal is produced. Similarly, by a selection of the frequency of the pilot signal sufficiently high that the frequencies of the sidebands of the signal generated by the beam from cathode 322 represent only a small percentage departure from the carrier frequency, a large value load impedance may be used so that a correspondingly large output signal is produced. As is readily apparent to those skilled in the art the load impedance 316 shown as a resistor may take other forms, i. e., may include a resonant circuit, so that the conditions above set forth may be met.

It is evident from the remarks made in connection with the embodiment of the invention shown in Figure 1, that the phase shifter 344 of the system of Figure 6 may be omitted, and that the desired phase coincidence of the two signals may be achieved by appropriately displacing the points of impingement of the two beams on the target 310 by an amount and in a direction compensating the difference in the transit times of the signals through the two channels.

Furthermore, it is apparent that instead of varying the intensity of only one beam at a pilot signal rate, both of the beams may be varied in intensity by individual pilot signals. In such an instance, the respective pilot signals are given such frequency values that the resultant picture signal modulated waves produced across the load impedance 316 have mutually exclusive frequency spectra. The two signals may then be separately detected in individual channels and thereafter combined.

While I have described my invention by means of specific examples and specific embodiments, I do not wish to be limited thereto for obvious modifications will occur to those skilled in the art without departing from the spirit and scope of the invention.

What I claim is:

1. A cathode-ray tube system comprising a cathode-ray tube having means for generating first and second electron beams, means for individually controlling the intensity of said beams, and a beam responsive member common to and arranged in the path of said beams, means for synchronously scanning said beams over said beam responsive member, said beam responsive member exhibiting at different portions thereof different responses to electron impingement and thereby being adapted to produce first and second response signals upon impingement by said beams, said first response signal having variations as determined by the rate of scanning said first beam over said different portions and by variations of the intensity of said first beam, said second response signal having variations as determined by the rate of scanning said second beam over said different portions and by variations of the intensity of said second beam, means for cyclically varying the intensity of said first beam, and means for selectively deriving said first signal from said beam intercepting member.

2. A cathode-ray tube system as claimed in claim 1 wherein the intensity of said first beam is cyclically varied at a given frequency distinct from the frequency of any variations of the intensity of said second beam.

3. A cathode-ray tube system as claimed in claim 2 wherein said beam responsive member comprises a plurality of spaced, substantially parallelly arranged longitudinal portions, and wherein said scanning means comprises means for periodically deflecting said beams across the beam responsive member to thereby successively scan the beams over said spaced portions.

4. A cathode-ray tube system as claimed in claim 2 wherein said beam responsive member comprises consecutively arranged portions, each of said portions comprising a plurality of stripes of fluorescent material, each of said stripes producing light of a different color in response to electron impingement, and said member further comprises second portions spaced apart and arranged substantially parallelly in a geometric configuration indicative of the position of said color stripes and comprising a material having a given response to electron impingement different from the response of said first portions, and wherein said scanning means is adapted to periodically deflect said beams across the beam responsive member to thereby scan the said beams over the said color stripes and the said second portions.

5. A cathode-ray tube system comprising a cathode-ray tube having means to generate a plurality of electron beams, means to individually control the intensities of said beams, a beam responsive member, said beam responsive member comprising consecutively arranged first portions arranged in the path of said beams and each comprising a plurality of stripes of fluorescent material, each of said stripes producing light of a different color in response to electron impingement, said beam responsive member further comprising second portions arranged in the path of said beams, said second portions being spaced apart and arranged substantially parallelly in a geometric configuration indicative of the position of said color stripes and comprising a material having a given response to electron impingement different from the response of said first portions, means for applying to a first of said individual control means a first control signal having a frequency spectrum of given maximum extent and having amplitude variations indicative of desired variations of the response of said color stripes, means for applying to a second of said control means a cyclically varying control signal having a frequency greater than the maximum frequency of said spectrum, for periodically deflecting said beams in synchronism across said portions of said beam responsive member to thereby produce a plurality of response signals each determined by the intensity of a respective one of said beams and further determined by the response of said second portions, one of said response signals having a frequency established by the algebraic sum of the frequency of said second control signal and by the rate of scanning the said second portions, and means for selectively deriving said one response signal from said beam responsive member.

6. A cathode-ray tube system comprising, a cathode-ray tube having means to generate two electron beams, individual control means to individually vary the intensities of said beams, a beam intercepting structure for producing a first given response upon impingement by electrons of said beams, said structure having portions thereof common to and arranged in the path of said beams, said portions being spaced apart and producing a second given response upon impingement thereof by electrons of said beams, and means to produce output signals indicative of intensity variations of said beams and of said second given response, means to apply to one of said control means a first control signal having a frequency spectrum of given maximum extent and having variations indicative of desired variations of said first given response, means to apply to the other of said control means a second control signal having a frequency greater than the maximum frequency of said frequency spectrum of said first control signal, means for periodically scanning said beams in synchronism across said portions of said beam intercepting structure to thereby produce a first response signal having a frequency determined by the frequency of said first control signal and the rate of scanning said second portions by said beams and a second response signal having a frequency determined by the frequency of said second control signal and the rate of scanning said second portion by said beams, and means coupled to said beam intercepting structure to select said second response signal to the exclusion of said first response signal.

7. A cathode-ray tube system as claimed in claim 6 wherein said two beams are arranged to simultaneously impinge on substantially the same portions of said beam intercepting structure throughout the said scanning of said beams.

8. A cathode-ray tube system as claimed in claim 6 wherein the said two beams are arranged to impinge on said beam intercepting structure at points thereof spaced apart by a predetermined substantially fixed amount throughout the scanning of the beams over the said beam intercepting structure.

9. A cathode-ray tube system comprising a cathode-ray tube having means for generating two electron beams, individual control means for individually varying the intensity of said beams, a beam intercepting structure common to and arranged in the path of said beams, said beam intercepting structure having at different portions thereof different responses to electron impingement as determined by variations of an electrical charge distribution formed at the surface thereof, means for synchronously scanning said beams over the said portion of said beam intercepting structure thereby producing first and second response signals having amplitude variations determined by the said charge distribution, said first response signal having a first frequency spectrum as determined by the rate of scanning a first of said beams over the different portions of said beam intercepting structure and by variations of the intensity of said first beam, said second response signal having a second frequency spectrum as determined by the rate of scanning the second of said beams over the different portions of said beam intercepting structure and by the rate of varying the intensity of said second beam, means for cyclically varying the intensity of said first beam at a frequency greater than the maximum frequency of said second frequency spectrum, and means for selectively deriving said first response signal from said beam intercepting structure.

10. A cathode-ray tube system as claimed in claim 9 wherein said first and second response signals have mutually exclusive frequency spectra, and further comprising first and second transmission channels, means coupled to said deriving means to apply said first response signal to said first channel to the exclusion of said second response signal, and means coupled to said deriving means to apply said second response signal to said second channel to the exclusion of said first response signal.

11. A cathode-ray tube system as claimed in claim 10 further comprising means to combine the outputs of said channels.

12. A cathode-ray tube system as claimed in claim 2 wherein said two beams are arranged to simultaneously impinge on substantially the same portion of said structure throughout the deflection of said beams over the surface of said structure.

13. A cathode-ray tube system as claimed in claim 2 wherein the said two beams are arranged to impinge on said beam intercepting structure at points thereof spaced apart by a given substantially fixed amount throughout the deflection of the beams over the beam intercepting structure.

14. A cathode-ray tube system for producing a color television image, comprising a cathode-ray tube having means to generate first and second electron beams, means to individually control the intensities of said beams, a beam intercepting structure comprising consecutively arranged portions arranged in the path of said beam, each comprising a plurality of stripes of fluorescent material, each of said stripes producing light of a different color upon electron impingement, said structure having second portions thereof arranged in the path of said beams, said second portions being spaced apart and comprising a material having a given characteristic response to impingement of electrons thereon, means to generate a pilot carrier wave of a given first frequency, means to apply said carrier wave to said beam intensity control means to individually vary the intensity of one of said beams at a rate determined by said carrier wave, means for periodically deflecting said beams in synchronism across said first and second portions of said beam intercepting structure to thereby produce at said beam intercepting structure a plurality of response signals each indicative of the intensity variations of a respective one of said beams and further indicative of the response of said second portions, means to derive from said response signals an indexing signal having a frequency established by the said intensity variations of said one beam and the rate of scanning said one beam over said second portions, means to produce a first color video wave having a component at the frequency of said pilot carrier wave, means to combine said first color video wave and said indexing signal to produce a second color video wave having a component at a frequency approximating the rate of scanning said first portions, and means to apply said second video wave to said intensity control means to individually vary the intensity of said second beam.

15. A cathode-ray tube system as claimed in claim 14 wherein the path of said beam and the said second combining means for the said first color video wave and for the said indexing signal effect a phase delay for the said second color video wave, and wherein the said first and second beams synchronously scan said beam intercepting member and are arranged to impinge at individual points thereof spaced apart a distance proportional to said phase delay.

16. A cathode-ray tube system for producing a video signal indicative of the spectral distribution of a visual image, comprising a cathode-ray tube having means to generate first and second electron beams, means to individually control the intensities of said beams, a beam intercepting structure comprising a target electrode having portions common to and arranged in the path of said beams, said portions being adapted to generate an electrical space charge having a distribution indicative of spectral variations of an image at the surface of said target electrode, means for applying a first control signal to said beam intensity controlling means to individually control the intensity of one of said beams, means for applying a second control signal having a cyclically varying amplitude to said beam intensity controlling means to individually cyclically vary the intensity of the other of said beams at a rate established by said second control signal, means for periodically deflecting said beams in synchronism across said portions of said target electrode to thereby produce at said target electrode a first response signal having a frequency spectrum established by said first control signal and by the said space charge distribution and a second response signal having a frequency spectrum established by said second control signal and the said space charge distribution, said second control signal having a frequency greater than the maximum frequency of the frequency spectrum of said first response signal, means to separate said first and second response signals into individual channels, means to detect said separated second response signal, and means to combine said detected signal and said first response signal.

17. A cathode-ray tube system as claimed in claim 16 wherein said first control signal is a D.-C. signal and said second control signal has a frequency equal to at least twice the maximum frequency of the frequency spectrum of said first response signal.

18. A cathode ray tube system for producing a color television image, comprising a cathode ray tube having means for generating first and second electron beams, means for individually controlling the intensities of said beams, and a beam intercepting structure arranged in the path of said beams, said structure comprising consecutively arranged first portions each comprising a plurality of stripes of fluorescent material, each of said stripes producing light of a different color upon electron impingement, said structure further comprising second portions spaced apart and arranged in a geometric configuration indicative of the position of said fluorescent stripes and comprising a material having a given detectable response to the impingement of electrons thereon, means for applying to the intensity controlling means of the first of said beams a video signal having variations indicative of desired variations of the response of said fluorescent stripes, means for applying to the intensity controlling means of the second of said beams a pilot carrier wave having a frequency distinct from the frequency of the variations of said video signal, means for periodically deflecting said beams in synchronism across said beam intercepting structure thereby to energize said first and second portions of said beam intercepting structure and produce a response signal having a frequency established by the said intensity variations of said second beam and by the rate of scanning said second beam over said second portions, and means for selectively deriving said response signal from said beam intercepting structure.

19. A cathode ray tube system for producing a color television image, comprising a cathode ray tube having means for generating first and second electron beams, means for individually controlling the intensities of said beams, and a beam intercepting structure, said beam intercepting structure comprising consecutively arranged first portions each comprising a plurality of stripes of fluorescent material, each of said stripes producing light of a different color in response to electron impingement, said structure further comprising second portions spaced apart and an electron permeable light reflecting layer interposed between said stripes of fluorescent material and said second portions, said second portions being arranged substantially parallel to said fluorescent stripes in a geometric configuration indicative of the position of said fluorescent stripes and comprising a material having a response detectably different from the response of said electron permeable layer upon electron impingement, means for applying to the intensity controlling means of the first of said beams a video signal having variations indicative of desired variations of the response of said fluorescent stripes, means for applying to the intensity controlling means of the second of said beams a pilot carrier wave having a frequency distinct from the frequency of the variations of said video signal, means for periodically deflecting said beams in synchronism across said beam intercepting structure thereby to energize said first and second portions of said beam intercepting structure and produce a response signal having a frequency established by the said intensity variations of said second beam and by the rate of scanning said second beam over said second portions, and means for selectively deriving said response signal from said beam intercepting structure.

References Cited in the file of this patent

UNITED STATES PATENTS

| | | |
|---|---|---|
| 2,490,812 | Huffman | Dec. 13, 1949 |
| 2,516,314 | Goldsmith | July 25, 1950 |
| 2,516,752 | Carbrey | July 25, 1950 |
| 2,530,431 | Huffman | Nov. 21, 1950 |
| 2,545,325 | Weimer | Mar. 13, 1951 |
| 2,579,705 | Schroeder | Dec. 25, 1951 |
| 2,631,259 | Nicoll | Mar. 10, 1953 |

UNITED STATES PATENT OFFICE

CERTIFICATE OF CORRECTION

Patent No. 2,742,531 April 17, 1956

Melvin E. Partin

It is hereby certified that error appears in the printed specification of the above numbered patent requiring correction and that the said Letters Patent should read as corrected below.

Column 9, line 70, for "of the electrode" read --of electrode--; column 11, line 47, for "and by the" read --and by--; column 13, line 68, after "spectrum," insert --means--; column 14, line 52, for "portion" read --portions--.

Signed and sealed this 3rd day of September 1957.

(SEAL)
Attest:
KARL H. AXLINE
Attesting Officer

ROBERT C. WATSON
Commissioner of Patents